United States Patent
Guimbard et al.

(10) Patent No.: US 9,518,467 B2
(45) Date of Patent: Dec. 13, 2016

(54) BLADE WITH 3D PLATFORM COMPRISING AN INTER-BLADE BULB

(71) Applicant: SNECMA, Paris (FR)

(72) Inventors: Jean-Michel Guimbard, Cely en Biere (FR); Olivier Kueny, Montgeron (FR); Ludovic Pintat, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/591,576

(22) Filed: Jan. 7, 2015

(65) Prior Publication Data

US 2015/0147179 A1    May 28, 2015

Related U.S. Application Data

(63) Continuation of application No. 12/919,781, filed as application No. PCT/FR2009/050317 on Feb. 27, 2009, now abandoned.

(30) Foreign Application Priority Data

Feb. 28, 2008  (FR) .................................. 08 51274

(51) Int. Cl.
*F01D 5/22* (2006.01)
*F01D 5/14* (2006.01)

(52) U.S. Cl.
CPC .............. *F01D 5/143* (2013.01); *F01D 5/145* (2013.01); *F01D 5/225* (2013.01);
(Continued)

(58) Field of Classification Search
CPC ...... F01D 5/143; F01D 5/145; F01D 2250/70; F01D 2240/33
(Continued)

(56) References Cited

U.S. PATENT DOCUMENTS 6,283,713 B1    9/2001  Harvey et al.
7,220,100 B2    5/2007  Lee et al.
(Continued)

FOREIGN PATENT DOCUMENTS

EP    1 270 872    1/2003
EP    1 669 544    6/2006
(Continued)

OTHER PUBLICATIONS

Translation of JP 2006-291889.*
(Continued)

*Primary Examiner* — Craig Kim
*Assistant Examiner* — Jason Fountain
(74) *Attorney, Agent, or Firm* — Oblon, McClelland, Maier & Neustadt, L.L.P.

(57) ABSTRACT

A blade for a turbomachine impeller including an airfoil, and a platform extending at one of the ends of the airfoil in a direction globally perpendicular to a longitudinal direction of the airfoil, the blade configured, together with other identical blades, to form a ring around a ring axis, with the adjacent blade platforms joining in pairs so as to form an inter-airfoil surface linking the pressure surface of one airfoil to the suction surface of the neighboring airfoil. In this blade, the inter-airfoil surface includes, in an upstream half of the airfoil, a boss located closer to the pressure surface than to the suction surface, and a recessed passage located between the same and the suction surface.

10 Claims, 3 Drawing Sheets

(52) U.S. Cl.
 CPC ...... *F05D 2240/80* (2013.01); *F05D 2250/70* (2013.01); *Y02T 50/673* (2013.01)

(58) Field of Classification Search
 USPC ......... 415/914; 416/189, 193 R, 193 A, 248, 416/DIG. 2
 See application file for complete search history.

(56) References Cited

U.S. PATENT DOCUMENTS

| | | | |
|---|---|---|---|
| 7,354,243 | B2 | 4/2008 | Harvey |
| 7,887,297 | B2* | 2/2011 | Allen-Bradley et al. .. 416/193 A |
| 8,192,153 | B2* | 6/2012 | Harvey .................. F01D 5/141 |
| | | | 415/191 |
| 8,231,353 | B2 | 7/2012 | Siden et al. |
| 8,647,066 | B2 | 2/2014 | Guimbard et al. |
| 2006/0127220 | A1 | 6/2006 | Lee |
| 2006/0140768 | A1 | 6/2006 | Tam et al. |
| 2007/0258818 | A1 | 11/2007 | Allen-Bradley et al. |
| 2007/0258819 | A1 | 11/2007 | Allen-Bradley et al. |
| 2011/0014056 | A1 | 1/2011 | Guimbard et al. |
| 2012/0201688 | A1 | 8/2012 | Mahle et al. |
| 2012/0201692 | A1 | 8/2012 | Boston et al. |

FOREIGN PATENT DOCUMENTS

| | | |
|---|---|---|
| EP | 1 681 438 | 7/2006 |
| GB | 944 166 | 12/1963 |
| JP | 9-296701 | 11/1997 |
| JP | 2004-28065 | 1/2004 |
| JP | 2006291889 A * | 10/2006 |

OTHER PUBLICATIONS

Office Action issued in Japanese Patent Application No. 2010-548155 on Mar. 6, 2013 (w/ English translation).
Opposition issued in European Patent Application No. 09718837.9 on Nov. 15, 2013 (w/ English translation).

* cited by examiner

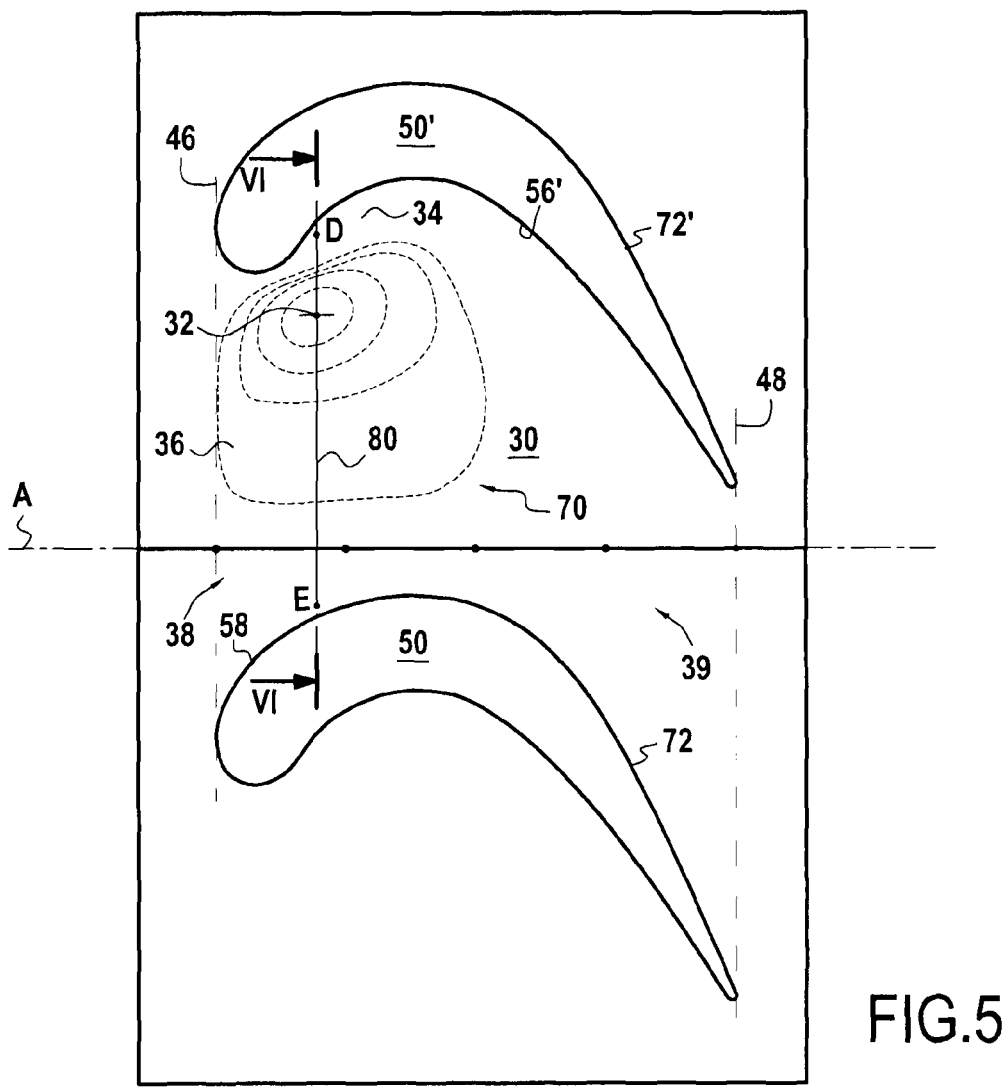
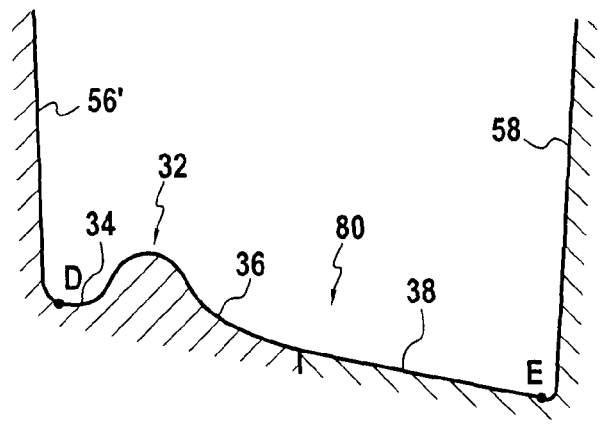
FIG.5
FIG.6

BLADE WITH 3D PLATFORM COMPRISING AN INTER-BLADE BULB

CROSS-REFERENCE TO RELATED APPLICATIONS

This application is a continuation of U.S. application Ser. No. 12/919,781 filed Dec. 22, 2010, the entire contents of which is incorporated herein by reference. Application Ser. No. 12/919,781 is a National Stage of International Application No. PCT/FR09/050317 filed Feb. 27, 2009, which is based upon and claims the benefit of priority to French Application No. 08 51274 filed Feb. 28, 2008.

BACKGROUND OF THE INVENTION

Field of the Invention

This invention relates to a blade for a turbomachine impeller comprising an airfoil formed with a pressure surface, a suction surface, a trailing edge, and a leading edge, and a platform extending at one of the ends of the airfoil in a direction which is globally perpendicular to a longitudinal direction of the airfoil, the blade being adapted to be arranged with a plurality of substantially identical blades to form a ring around a ring axis and define therealong an upstream and a downstream area, wherein the airfoils are arranged substantially radially in the ring, and the adjacent blade platforms join in pairs so as to form an inter-airfoil surface linking the pressure surface of an airfoil to the suction surface of the neighboring airfoil.

Description of the Related Art

Joining such blades around a common axis allows for composing an impeller, the axis of which is the axis of the ring. This impeller may be mobile, and thus receive energy from the jet, or communicate energy to the jet traveling through the impeller; it may also be fixed, and in this case, its function is to canalize the jet.

The blade can be a distinct part as such, or integrated with other blades so as to form for instance a distributor sector or a multiple bladed disk.

Usually, a turbomachine comprises several blade stages, forming a series of fixed or mobile impellers, successively arranged along the fluid path through the turbomachine (There may be several paths, especially in the case of bypass engines). The efficiency of the turbomachine is directly related to the capability of each of the impellers, and thus in particular each of the blades belonging thereto, to efficiently interact with the jet, i.e. without unnecessarily dissipating energy. It should be noted that namely in aeronautical turbomachines, such as turbojets or turboprops, jet speeds may be significant, namely supersonic: for a blade arranged in such a jet, it is essential to optimize the flow quality of the jet around the blade.

In the blade, the shape of the airfoil must naturally be optimized so as to efficiently guide the jet, in which the airfoil is located, or to receive or transmit maximum energy to the jet without dissipating energy by heating.

However, although the shape of the airfoil is important, it has been found that the shape of the surface of the platform on the side of the airfoil also plays an essential part for the flow quality of the jet through the blade. Thus, the phenomena, which the platforms of an impeller may affect can account for 30% of the total losses thereat.

For the sake of simplicity, in the following, a platform surface designates the surface of the platform on the side of the airfoil, without repeating on which side of this surface it is located.

The passage of the jet around the blades as those indicated in the preamble is illustrated in FIGS. 1 and 2.

FIG. 1 shows three identical blades 10, which are part of an impeller 100 presented in FIG. 2. Each blade 10 is designed to be assembled with other identical blades 10 so as to form an impeller 100. This impeller is essentially composed of the blades 10 mounted on a rotor disk 20. In this impeller 100, the blades 10 are mounted periodically around the axis A of the wheel. Globally, the fluid jet flows along the axis A of an upstream side to a downstream side of the impeller.

Each blade 10 comprises an airfoil 50, a platform 60, as well as a root 66 in the represented specific case of a rotor blade for fixing the blade to a rotor disk. The platform 60 extends in a direction which is globally perpendicular to the longitudinal direction of the airfoil 50 and comprises a platform surface 62 on the side of the airfoil. As the blades 10 are assembled against each other, the platforms thereof join in pairs so as to create a substantially continuous surface, the so-called 'inter-airfoil' surface 70 extending from the pressure surface 56 of one airfoil to the suction surface 58 of the neighboring airfoil. Thus, the inter-airfoil surface groups the adjacent portions of the platform surfaces 62 of two adjacent blades 10, 10' located between their respective airfoils 50. The platform surface 62 is linked to the outer surfaces of the airfoil 50 by connecting surfaces 18 (which are substantially connecting fillets having a tapered radius).

It should also be noted that in the examples represented in FIGS. 1 to 3, the surface 62 of the platform 60 is a surface of revolution, i.e. that the area thereof is substantially part of a surface of revolution around the axis A of the impeller. Herein, a surface of revolution around an axis designates a surface generated by rotating a curve around said axis. Such a shape is common for blade platform surfaces for turbomachine impellers.

In the flow, when the jet reaches the leading edge of an airfoil 50, it splits in two, going partly past the side of the pressure surface 56 and partly past the side of the suction surface 58 of the airfoil 50. FIG. 3 schematically presents how the pressure field is established in the 'inter-airfoil channel' 30 extending between the airfoils.

FIG. 3 is a sectional view perpendicular to the respective axes of the airfoils of two blades 10 and 10' mounted side by side in an impeller. More particularly, FIG. 3 shows approximately the pressure field which can usually be observed close to the inter-airfoil surface 70 between the suction surface 58 of a first airfoil and the pressure surface 56' of a second airfoil.

FIG. 3 comprises an iso-pressure curve 40 corresponding to a relatively high pressure, and an iso-pressure curve 42 corresponding to a relatively low pressure, these pressures being observed in the jet during operation of the turbomachine. A steep pressure gradient J is created between the pressure surface and the suction surface of the two airfoils due to pressure being greater close to the pressure surface than close to the suction surface. Under the effect of this pressure gradient J, a transverse flow to the 'inter-airfoil' channel 30 is generated at the root (and head) of the airfoils, and particles thus deflected are pushed towards the suction surface of the airfoil 50. Thereby, within the 'inter-airfoil' channel 30, strong secondary flows not directed in the main direction of flow are created which will generate eddies, namely close to the suction surface.

In order to try to limit unnecessary dissipation of energy resulting therefrom close to the inter-airfoil surface, the U.S. Pat. No. 7,220,100 proposes an inter-airfoil surface shape comprising mainly a convex ramp located immediately adjacent to the pressure surface of the airfoil, and a concave area located immediately adjacent to the suction surface of the airfoil, each of these areas being located substantially at the mid-point of the airfoil chord. In spite of this development, there is still a number of energy dissipating eddies in the space between the two airfoils, and therefore, there is a need for a blade shape further reducing the stray eddies formed in this space.

The U.S. Pat. No. 6,283,713 proposes another shape for the inter-airfoil surface, on the one hand comprising a convex region adjacent to the suction surface of the blade, and a concave region adjacent to the pressure surface of the blade, with these two regions having a significant dimension as they extend over most of the length of the chord of the blade. According to an alternative, the blade comprises at the trailing edge a boss and a recess, respectively located on the side of the suction surface and the pressure surface. However, these configurations of the inter-airfoil surface do not allow for the problem of unnecessary energy dissipation near this surface to be solved efficiently.

BRIEF SUMMARY OF THE INVENTION

It is a first object of the invention to propose a blade like the one presented in the preamble, which minimizes unnecessary dissipations of energy while the jet is interacting with the blade, and which still has low production cost by being relatively easy to manufacture.

This objective is achieved in that in the blade, the inter-airfoil surface, in an upstream half of the airfoil, comprises a boss located closer to the pressure surface than to the suction surface, and a recessed passage located between the same and the pressure surface.

A major advantage of the invention is due to the fact that the special shape of the platform surface previously exhibited allows for significant reduction of stray flows between the airfoils close to this surface between the airfoils. Furthermore, this surface may still be very easy to machine as a large part of the surface can be a surface of revolution.

The presence of the boss results in the speed of the jet increasing as pressure thereof is decreasing, namely in the area neighboring the pressure surface, which usually has greater pressure. Advantageously, the result will be that the high pressure area is reduced, and this will lead to a decrease in the pressure gradient in the inter-airfoil channel and a reduction of the undesirable energy dissipating eddies.

The objective of keeping a recess between this boss and the pressure surface is to center the high pressure reduction effect indicated above, precisely on the high pressure area. Due to such centering of the boss, not against the pressure surface but at a distance therefrom, the effect of the boss (attenuation of the harmful high pressure area) is at a maximum.

Furthermore, the recessed passage, substantially located along the pressure surface, generates a slight relative pressure increase in this area, thus contributing to dividing the high pressure area from the low pressure area, located opposite to the vicinity of the suction surface of the neighboring airfoil.

In this document, the various examples used present a blade having a platform located on the inner side with respect to the airfoil, in the radial direction, and not on the outside. It should be noted in this respect that the invention equally aims at a blade comprising a platform located at the head of the airfoil, i.e. on the side radially opposite the center of the ring, and a blade comprising a platform located at the root of the airfoil, on the inside with respect to the ring. A blade comprising both of these platforms, at the head and the root of the airfoil, is also possible, with at least one platform arranged so that an inter-airfoil surface according to the invention can be formed.

On the other hand, the invention aims at any blade capable of being integrated into a turbomachine, and in particular into aeronautical turbomachines. The inventive blade turns out to be particularly useful in turbine stages, especially of low pressure turbines.

An advantageous design of the platform of the blade is defined with respect to a profile perpendicular to ring axis A. In this embodiment, the inter-airfoil surface has a profile located in a plane perpendicular to the axis of the ring and located axially in an upstream half of the airfoil, said airfoil successively comprising a recess followed by a boss, starting from the pressure surface of the airfoil.

Indeed, the efficiency of the invention is particularly great when the recessed shape followed by a boss appears in a section of the inter-airfoil surface perpendicular to axis A.

First of all, it should be noted that in the above and in the following 'axially' refers to the axial position along axis A of the ring.

Also, a position axially defined with respect to the airfoil can also be defined equivalently with respect to the extension along axis A, of a cross-section of the airfoil close to the platform of the blade. Indeed, as the airfoil is arranged radially in the ring, the extension thereof along axis A, or the extension of a cross-section are substantially identical.

The cross-section of the airfoil can for instance be the section in the plane (P) represented in FIG. 1, and represented by the profiles 72 and 72' in FIG. 3. This section axially extends from line 46 at the highest upstream point of the airfoil (close to the platform surface), to line 48 corresponding to the lowest downstream point of the airfoil.

According to one embodiment, the inter-airfoil surface comprises a part of revolution having a shape of revolution with respect to the axis of the ring, located on the side of the suction surface of the airfoil neighboring the boss.

According to a development of the preceding embodiment, the boss is linked to said part of revolution by a radially descending surface. In other words, the surface between the boss and the part of revolution descends monotonously, without having intermediate folds, recesses, or bosses.

According to one embodiment, in the blade, the recessed passage comprises one part having a shape of revolution with respect to the axis of the ring.

According to one embodiment, the inter-airfoil surface comprises a part having a shape of revolution with respect to the ring axis and extending axially throughout the downstream half of the airfoil.

The three possibly complementary embodiments presented above allow for minimizing the production cost of the blade by keeping significant-sized parts of revolution, be it in a part of the inter-airfoil surface corresponding to the recessed passage or in a part of the inter-airfoil surface located between the boss and the suction surface of the neighboring airfoil, or else in the (axially) downstream half of the inter-airfoil surface.

The part of the production tools corresponding to the surfaces of revolution is thus particularly easy to make, thereby providing an equivalent reduction in the production cost of the blade.

Finally, in an inventive blade, the boss can continue or extend upstream or downstream of the inter-airfoil surface.

A second object of the invention is to propose a high performance turbomachine distributor sector, and the production cost of which is still reasonable. This objective is achieved in that the turbomachine distributor sector comprises at least one blade like those defined before.

A third object of the invention is to propose a high performance impeller, and the production cost of which is still reasonable. This objective is achieved in that the impeller comprises a plurality of blades like those defined before.

A fourth object of the invention is to propose a high performance turbomachine, and the production cost of which is still reasonable. This objective is achieved in that the turbomachine comprises at least one impeller like the one defined before.

BRIEF DESCRIPTION OF THE SEVERAL VIEWS OF THE DRAWINGS

The invention will be better understood and the advantages thereof will be more apparent from reading the following detailed description of non restrictive embodiments represented by way of example. The description refers to the appended drawings, in which:

FIG. 5 is a section of two aerodynamic blades according to the invention, showing the shape of the inter-airfoil surface by means of contour lines; and FIG. 6 is a section substantially perpendicular to the ring axis, of the inter-airfoil channel between two aerodynamic blades according to the invention.

DETAILED DESCRIPTION OF THE INVENTION

It should be noted that for the sake of simplicity, if an element appears on various figures, identically or in a slightly different form, the same number is assigned thereto in the various figures, and the element is described only the first time it is mentioned.

Figure 4:
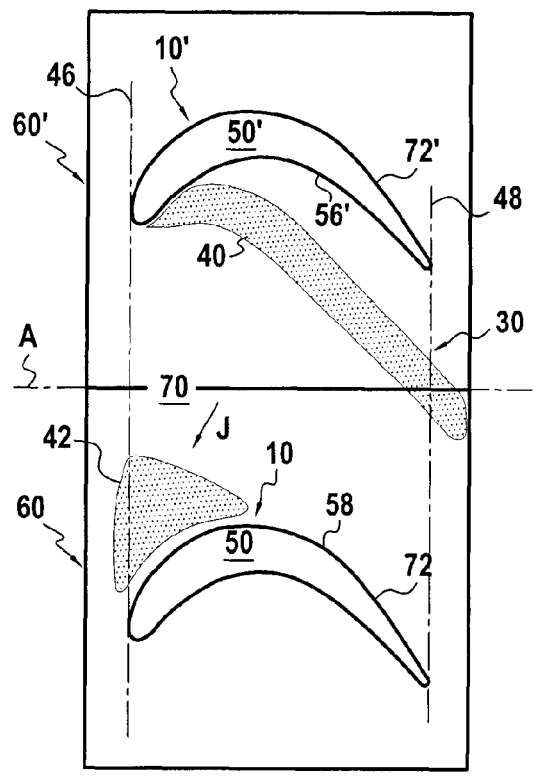
FIG. 4 is a section similar to the section of FIG. 3, but with both airfoils being part of blades according to the invention.

With reference to FIG. 4, we will now describe the effect produced on the pressure field in the inter-airfoil channel by a blade according to the invention.

The present invention defines a platform surface shape allowing to minimize stray turbulent phenomena close to the inter-airfoil surface, and thereby to increase the efficiency of the blade and thus the impeller. Comparing FIGS. 3 and 4 shows the relative effect of the invention on the pressure field in the inter-airfoil channel 30 allowing to obtain the specific shape of an inventive blade.

Figure 1:
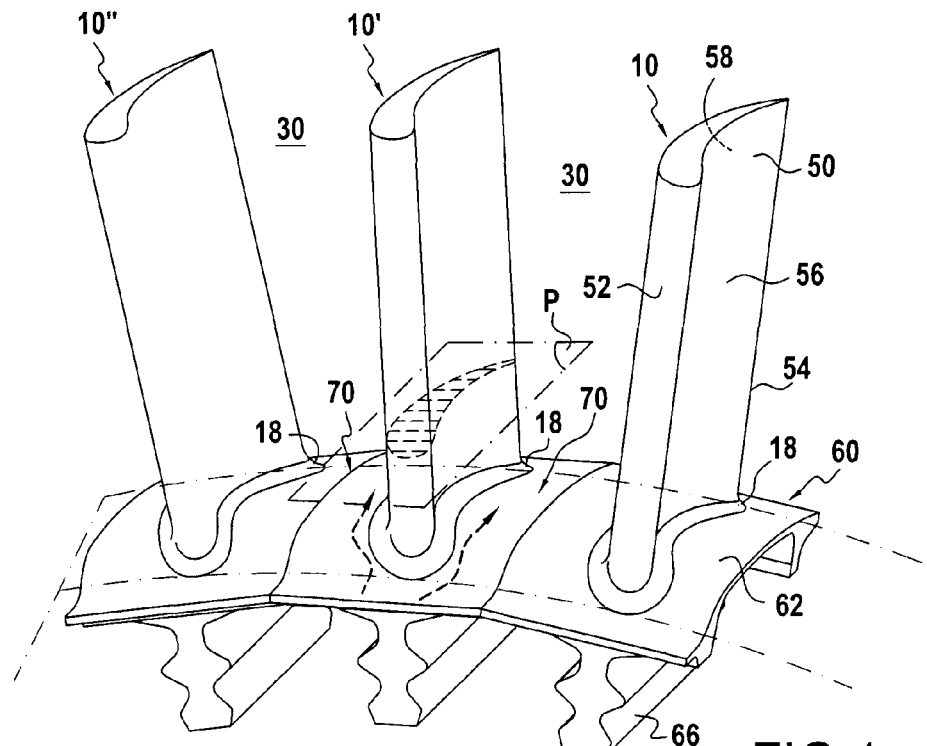
FIG. 1 already described is a perspective view of three known blades arranged in their relative position as they are mounted in an impeller.
Figure 2:
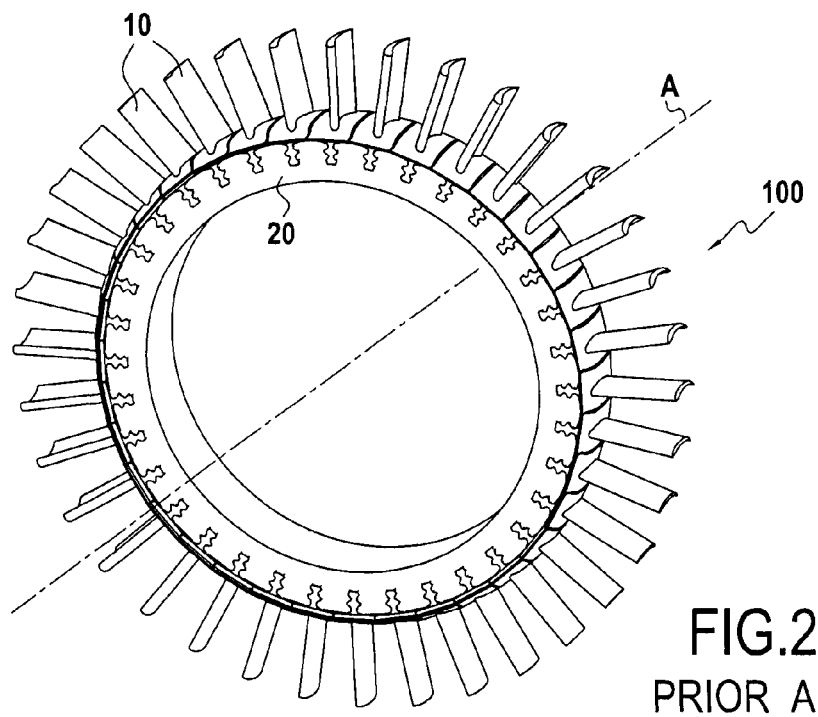
FIG. 2 already described is a perspective view of an impeller comprising the blades of FIG. 1.
Figure 3:
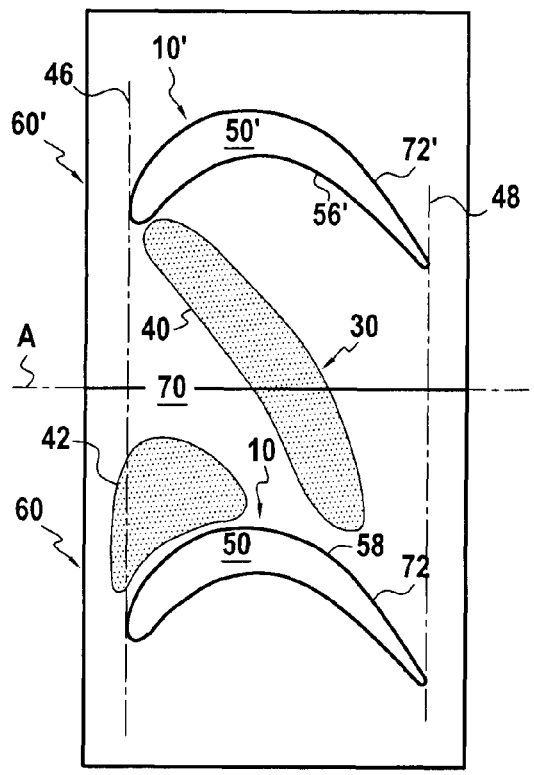
FIG. 3 already described is a section perpendicular to the axis of the airfoils of two airfoils of the aerodynamic blades represented in FIG. 1 showing the pressure fields in the space separating both blades.

While in FIG. 3, areas 40, 42, respectively of high and low pressure, are relatively close to each other, in FIG. 4, it can be seen that they are further apart from each other. Consequently, the pressure gradient is substantially reduced, as well as the tendency of the particles to migrate from the pressure surface to the suction surface thereby causing stray eddies.

With reference to FIGS. 5 and 6, we will now describe the arrangement of a blade according to the invention.

FIG. 5 shows sections 72 and 72' respectively of the two airfoils 50 and 50' in a radial view of the airfoils, i.e. substantially along the longitudinal axis of these two airfoils. Section 72 (like the identical section 72') is a section of airfoil 50 established close to the platform of the blade, on the flow side, at a distance from the platform sufficient for the section to represent the lower part of the airfoil and not to show the connecting surfaces 18 between the airfoil and the platform.

Sections 72 and 72' axially extend between lines 46 and 48, respectively corresponding to the highest upstream point and the lowest downstream point of the section, thus defining a scale along the section, respectively going from 0% to 100% from line 46 to line 48 along axis A.

FIG. 6 shows the profile 80 going through the inter-airfoil surface 70 between two inventive blades. Profile 80 is a sectional profile recorded in a plane perpendicular to axis A of the ring. This profile is located axially in the upstream half of the section of the airfoil.

FIG. 6 shows by means of contour lines the shapes of the inter-airfoil surface 70 between the two contours 72 and 72' previously presented in relation with FIG. 6.

Inter-airfoil surface 70 comprises a boss 32, located at a distance from the pressure surface 56', but still close thereto, and separated therefrom by a recessed passage 34 following therealong and facilitating the jet going along the pressure surface. Boss 32 is located axially mainly in the upstream half of section 72 of airfoil 50.

More precisely, the boss has an apex (32) located axially between 0 and 50% of the airfoil (50) on the upstream side, and preferably between 0 and 25% thereof.

Boss 32 is linked to the suction surface, following contour 80, by a slope 36 (or a radially descending surface) continued by one part of a surface of revolution 38.

Furthermore, the part of the inter-airfoil surface located axially in the downstream half of the airfoil is formed by a surface of revolution 39 with respect to the axis A of the ring.

The invention claimed is:

1. A blade for a turbomachine impeller, comprising:
an airfoil including a pressure surface, a suction surface, a trailing edge, and a leading edge; and
a platform extending at one of the ends of the airfoil in a direction which is globally Perpendicular to a longitudinal direction of the airfoil,
wherein the blade is adapted to be arranged with a plurality of substantially identical blades to form a ring around a ring axis and define therealong upstream and a downstream area, with the ring having the airfoils arranged substantially radially therein, and the adjacent blade platforms joining in pairs so as to form an inter-airfoil surface linking the pressure surface of an airfoil to the suction surface of the neighboring airfoil,
wherein in an upstream half of the airfoil, only a single boss is formed on the inter -airfoil surface, the boss being located closer to the pressure surface than to the suction surface, and a recessed passage is located between the boss and the pressure surface,
wherein the inter-airfoil surface comprises a part of revolution having a shape of revolution with respect to the ring axis, located on a side of the suction surface of the airfoil neighboring the boss,
wherein the boss is linked to the part of revolution by a radially descending surface, and
wherein the boss occupies a majority of the portion of the inter-airfoil surface which extends in a circumferential direction from the pressure surface of the airfoil to the suction surface of the neighboring airfoil and axially from 0% to 50% of an axial extent of the airfoil from the leading edge of the airfoil; wherein the boss includes an apex located axially between 0% and 25% of the airfoil on the upstream side.

2. The blade according to claim 1, wherein the inter-airfoil surface has a profile located in a plane perpendicular to the ring axis and located axially in the upstream half of the airfoil, the recessed passage being immediately adjacent to the boss and immediately adjacent to the pressure surface of the airfoil.

3. The blade according to claim 1, wherein the inter-airfoil surface comprises a part having a shape of revolution with respect to the ring axis and extending axially throughout the downstream half of the airfoil.

4. The blade according to claim 1, wherein the boss is continued upstream or downstream of the inter-airfoil surface.

5. A turbomachine nozzle segment, comprising at least one blade according to claim 1.

6. An impeller comprising a plurality of blades according to claim 1.

7. A turbomachine comprising at least one impeller according to claim 6.

8. The blade according to claim 1, wherein the platform is located at a tip of the airfoil, on a side of the airfoil radially opposite the center of the ring.

9. The blade according to claim 1, wherein the inter-airfoil surface has a profile located in a plane perpendicular to the ring axis and located axially in the upstream half of the airfoil, the profile successively comprising the recessed passage followed by the boss, starting from the pressure surface of the airfoil, wherein the profile represents a cross-section of the inter-airfoil platform passing by an apex of the boss, and wherein, in the profile, the apex is on a pressure surface side relative to the overall extent of the boss.

10. The blade according to claim 1, wherein the boss includes an apex, and a slope of the boss on an upstream side of the apex is steeper than a slope of the boss downstream side of the apex.

* * * * *